(12) United States Patent
Cranfill et al.

(10) Patent No.: US 7,483,543 B2
(45) Date of Patent: Jan. 27, 2009

(54) STEREO IMAGING MANIFOLD AND METHOD FOR USE IN A PORTABLE ELECTRONIC DEVICE

(75) Inventors: David Cranfill, Sparta, NJ (US); David Brenner, Mundelen, IL (US); Richard Thrush, Garwood, NJ (US)

(73) Assignee: Motorola, Inc., Libertyville, IL (US)

( * ) Notice: Subject to any disclaimer, the term of this patent is extended or adjusted under 35 U.S.C. 154(b) by 715 days.

(21) Appl. No.: 10/337,057

(22) Filed: Jan. 6, 2003

(65) Prior Publication Data

US 2004/0131202 A1 Jul. 8, 2004

(51) Int. Cl.
*H04R 1/02* (2006.01)
*H04R 9/06* (2006.01)

(52) U.S. Cl. .................. 381/334; 381/337; 379/433.02; 455/569.1

(58) Field of Classification Search ......... 381/334–336, 381/89, 87, 345, 351, 337–339; 379/420.02, 379/433.02, 432; 455/569.1, 350
See application file for complete search history.

(56) References Cited

U.S. PATENT DOCUMENTS

| 2,610,694 | A | | 9/1952 | DeBoer |
| 2,710,662 | A | | 6/1955 | Camras |
| 2,923,370 | A | | 2/1960 | DeCapite |
| 3,105,113 | A | | 9/1963 | Olson |
| 4,388,492 | A | | 6/1983 | Sato |
| 4,923,031 | A | | 5/1990 | Carlson |
| 5,588,041 | A | | 12/1996 | Meyer, Jr. et al. |
| 5,909,490 | A | * | 6/1999 | Sokolich et al. ........ 379/433.02 |
| 6,002,949 | A | * | 12/1999 | Hawker et al. ........... 455/569.1 |
| 6,138,040 | A | * | 10/2000 | Nicholls et al. .......... 455/569.1 |
| 6,148,080 | A | * | 11/2000 | Collin ................... 379/433.02 |
| 6,324,284 | B1 | * | 11/2001 | Hawker et al. ......... 379/433.02 |
| 6,434,407 | B1 | * | 8/2002 | Cook ....................... 455/569.1 |
| 6,668,063 | B2 | * | 12/2003 | Cimaz et al. ................. 381/345 |
| 6,711,274 | B2 | * | 3/2004 | Asahina et al. .............. 381/386 |
| 6,758,303 | B2 | * | 7/2004 | Zurek et al. ................. 181/155 |
| 6,763,110 | B1 | * | 7/2004 | Sung ..................... 379/433.02 |
| 2001/0036286 | A1 | | 11/2001 | Layton et al. |
| 2002/0137478 | A1 | * | 9/2002 | Masamura ................... 455/90 |

FOREIGN PATENT DOCUMENTS

RU 2120192 C1 10/1998

* cited by examiner

*Primary Examiner*—Xu Mei
(74) *Attorney, Agent, or Firm*—Lawrence J. Chapa

(57) ABSTRACT

A sound system assembly for use in a hand held device is provided. The sound system assembly includes a pair of transducers, and a corresponding pair of manifolds, which redirect the sound produced by the transducers away from the front or back surface of the device toward respective side facings of the hand held device. By redirecting the sound produced by the transducers, the apparent source of each audio source, corresponding to the respective opening in each of the sides of the hand held device through which the sound waves exit the device, is displaced further apart horizontally.

15 Claims, 5 Drawing Sheets

STEREO IMAGING MANIFOLD AND METHOD FOR USE IN A PORTABLE ELECTRONIC DEVICE

FIELD OF THE INVENTION

The present invention relates generally to sound system assemblies and, more particularly, to sound system assemblies for producing stereo audio imaging including manifolds for porting the generated sound out of the device.

BACKGROUND OF THE INVENTION

As opposed to mono audio recording, stereo audio recording and playback has been used to provide a richer audible user experience. In stereo audio recording, a music signal is mixed into "left" and "right" signals, so that when played through a pair of speakers spaced a nominal distance apart, the listener perceives a sound field, that offers the illusion of instruments placed in actual locations on a virtual stage. In human hearing, the brain determines the apparent location of an event, like the apparent placement of individual instruments, based upon the arrival time, subtle frequency response differences and intensity of the sound waves that reach each of the listener's ears. The quality and realism of a stereo audio image experienced by the listener is dependent upon the design and quality of the speakers used for playback, and the location of the speakers, relative to the listener.

In recent years, several software programs have been used to enhance and add greater three dimensional effects to ordinary stereo, through computations and manipulations of the individual sound signals, in some cases using digital signal processing techniques. However, regardless of the method used to create or enhance a stereo audio signal, the spacing of the speakers, relative to the listener, remains a major factor in the quality of the stereo image experienced by the listener.

For many handheld type devices, like wireless communication devices, there is a trend toward smaller devices. Smaller devices are easier to carry on one's self, where the smaller the device, the greater the number of options for the location where the user can store the device (i.e a pocket, a belt clip, a small hand bag, etc.). However, as the device size decreases, so does the volume and surface area of the device, within and upon which the components can be located, which the user uses to interface with the device. For example, displays, microphones, speakers and keypads have external interfaces that are generally located at various positions around the external surface of the device, where they are conveniently accessible by the user, and are coupled to corresponding components internal to the device.

When adding stereo playback capability to a wireless communication device or other hand held portable electronic device, the placement of the right and left speaker is constrained by the overall size of the device, resulting in a relatively close spacing of the two speaker elements. For a wireless communication device the problem is further frustrated by the typical aspect ratio of hand held devices, which are narrower in the horizontal direction and taller in the vertical direction. This is due to the fact, that the speakers need to be generally separated in the horizontal direction, which corresponds to the listener's ears, which are similarly displaced from one another in a generally horizontal direction.

Still further the depth of the device, or distance between the front facing of the device and the back facing of the device, is relatively shallow, as compared to both the height and the width of the device. As a result, in prior hand held devices, the speakers or transducers, have been oriented with the plane of their front facing parallel to the front facing of the device. Traditionally, in these instances, the sound from the speakers has been ported directly out of the device in a direction of travel that is generally perpendicular to the front facing of the speakers. However given the necessary diameter of many speakers, this has resulted in the output ports for the speakers being further limited in their horizontal displacement. For example, a 40 mm wide cellular telephone, incorporating a pair of 18 mm diameter transducers, would have their acoustic centers separated by approximately 19 mm. Such a distance would limit the quality of a stereo image.

The present inventors have recognized, that if instead of directly porting the sound from the speakers in a direction that is perpendicular to the front facing of the device, the sound waves produced by the speakers are directed away from the front or back facing of the device, toward alternative ones of the two opposing side facings of the device. In this way the location of the ports, which are now located proximate alternative side edges of the device, becomes the apparent source of the respective audio signals, thereby maximizing the apparent relative horizontal displacement of the right and left audio sources.

SUMMARY OF THE INVENTION

The present invention provides a sound system assembly for use in a hand held device, which has a front facing, a back facing and two opposing side facings. The sound system assembly includes a first transducer and a second transducer, and a first manifold and a second manifold. The first transducer produces sound waves, and has a front facing, which is directed substantially toward one of the front facing and the back facing of the hand held device. The second transducer similarly produces sound waves, and has a front facing, which is directed substantially toward one of the front facing and the back facing of the hand held device.

The first manifold has a first opening aligned with the front facing of the first transducer, a second opening aligned with a first one of the two opposing side facings of the hand held device, and a path therebetween, which couples the first opening to the second opening. The path redirects the sound waves produced by the first transducer away from the front or back facing, that the front facing of the first transducer is directed toward, toward the first one of the two opposing side facings.

The second manifold has a first opening aligned with the front facing of the second transducer, a second opening aligned with a second one of the two opposing side facings of the hand held device, and a path therebetween, which couples the first opening to the second opening. The path redirects the sound waves produced by the second transducer away from the front or back facing, that the front facing of the second transducer is directed toward, toward the second one of the two opposing side facings.

In at least one embodiment, the sound waves produced by the transducers are redirected in a direction that is substantially perpendicular to the direction of travel of the sound waves, when the sound waves are originally produced by the corresponding transducer.

In at least a further embodiment, the second opening of each of the manifolds is a slot having a slot length that is larger than the contact surface of a user's finger, such that if the user's finger covers any portion of the slot, the user's finger does not cover the entire slot.

The present invention further provides a method of reproducing a stereo audio image in a hand held device, which has a pair of transducers ported out of the device via a pair of corresponding manifolds having a first opening aligned with the respective one of the pair of transducers and a second opening aligned with an exterior surface of the hand held device. The method includes producing a sound wave at a first transducer having a front facing directed toward one of a front and back facing of the hand held device toward which the sound wave produced by the first transducer initially propagates. The direction of travel of the sound wave produced by the first transducer is then redirected away from the one of the front and back facing of the hand held device toward an exterior side surface of the hand held device via a first manifold.

The method further includes producing a sound wave at a second transducer having a front facing directed toward one of a front and back facing of the hand held device toward which the sound wave produced by the second transducer initially propagates. The direction of travel of the sound wave produced by the second transducer is then redirected away from the one of the front and back facing of the hand held device toward an exterior side surface of the hand held device via a second manifold, which is opposite to the exterior side surface through which the sound wave produced by the first transducer is redirected.

These and other features, and advantages of this invention are evident from the following description of one or more preferred embodiments of this invention, with reference to the accompanying drawings.

DETAILED DESCRIPTION OF THE PREFERRED EMBODIMENT(S)

Figure 1:
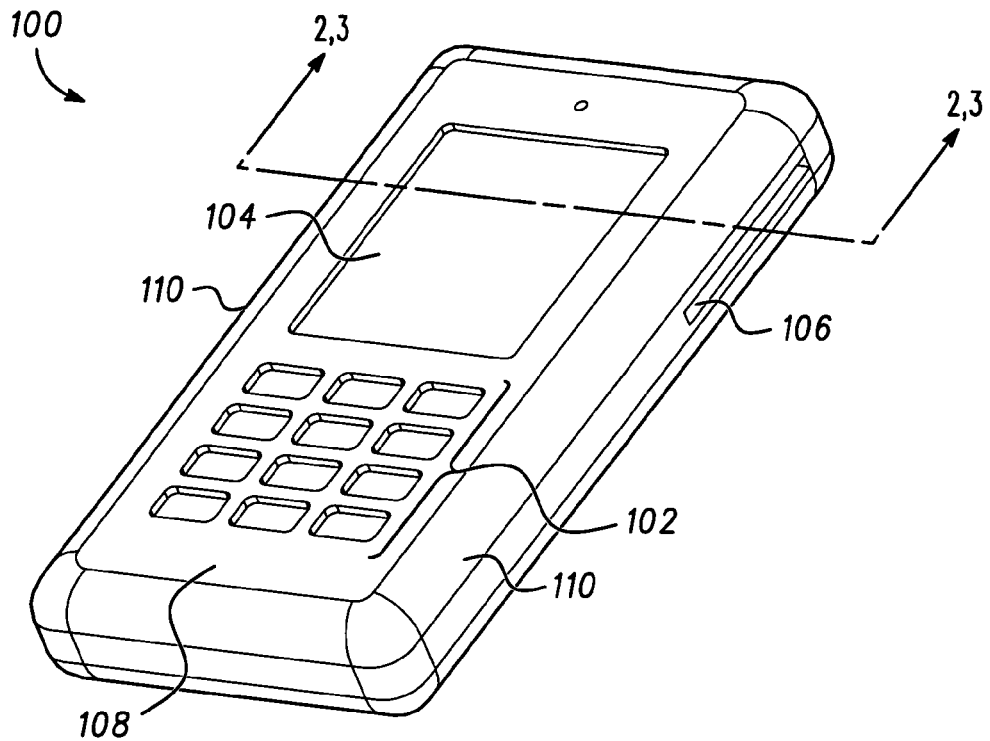
FIG. 1 is a perspective view of a hand held device, in accordance with at least one embodiment of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a perspective view of a hand held device 100, in accordance with at least one embodiment of the present invention. The hand held device 100 includes a keypad 102 having multiple keys, which can be selectively actuated. The hand held device 100 additionally includes a display 104 for visually presenting information to a user, and at least a pair of speaker ports 106, only one of which is shown in FIG. 1. The display 104 and the keypad 102 are located at a front facing 108 of the hand held device 100. Each one of the pair of speaker ports 106 are located on alternate side facings 110 of the hand held device. In the illustrated embodiment, the speaker ports are sized and shaped as slots, which extend partially along the length of the respective side facings 110.

Figure 2:
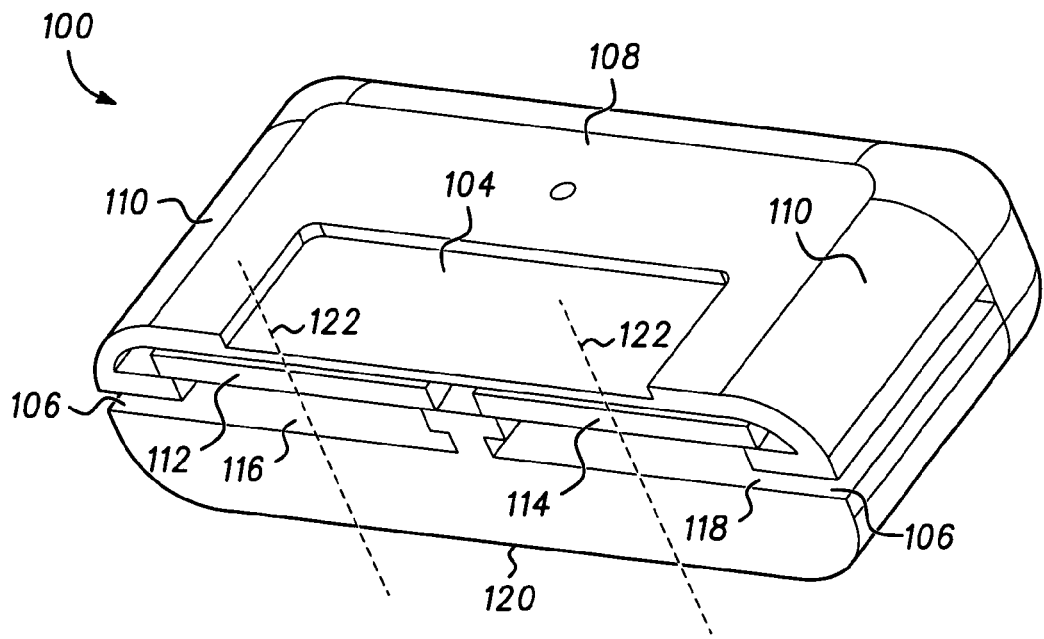
FIG. 2 is a perspective cross sectional view of the hand held device illustrated in FIG. 1, in accordance with at least one embodiment of the present invention.
Figure 3:
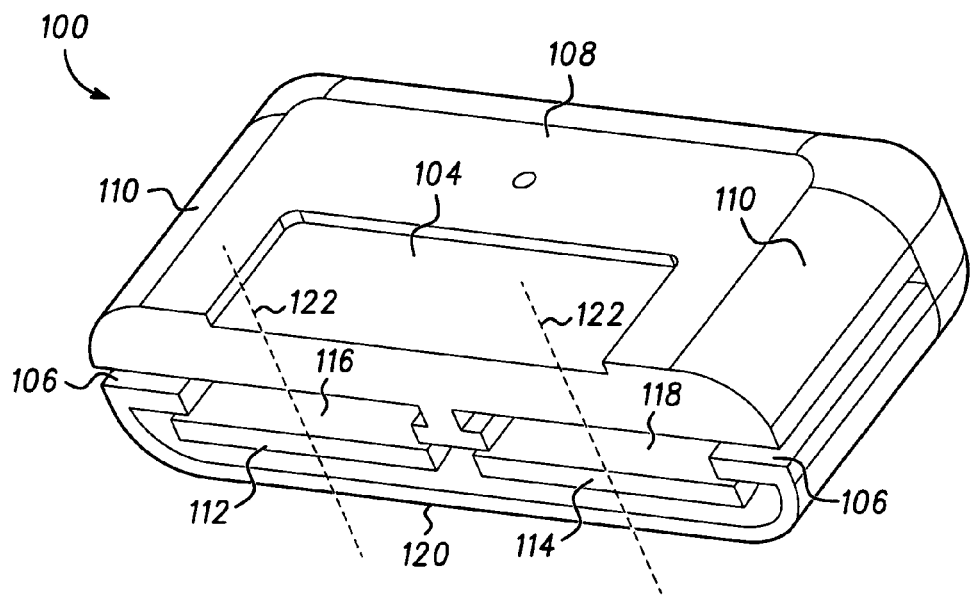
FIG. 3 is a perspective cross sectional view of the hand held device illustrated in FIG. 1, in accordance with at least one alternative embodiment of the present invention.

FIGS. 2 and 3 illustrate perspective cross sectional views of the hand held device illustrated in FIG. 1, in accordance with at least two alternative embodiments. The cross sectional views are taken along sectional lines, illustrated in FIG. 1. Generally, each of the alternative embodiments, illustrate at least a portion of a sound system assembly including a partial view of a pair of transducers 112, 114, and a pair of manifolds 116, 118. In each of the illustrated embodiments, the front facing of the transducers is substantially parallel with the front 108 and back 120 facings of the hand held device 100. The orientation of the transducers 112, 114 facilitates the production of sound waves that propagate, at least initially, in a direction that is substantially perpendicular 122 to the front 108 and back 120 facings of the device 100. The transducers 112, 114 illustrated in FIG. 2 have a front facing, which faces toward the back facing 120 of the device 110, and the transducers 112, 114 illustrated in FIG. 3 have a front facing, which faces toward the front facing 108 of the device 110. Correspondingly, the transducers 112, 114 produce sound waves in a direction consistent with the direction that the transducers 112, 114 are facing.

In the illustrated embodiments, the manifolds 116, 118 include a first opening, which corresponds to the front facing of a respective one of the transducers 112, 114, and a second opening, which aligns with a respective one of the ports 106 located at the exterior side surface 110 of the hand held device 100. The first opening of each manifold 116, 118 is coupled to the second opening 106 of the respective manifold 116, 118 via a path extending between the two openings. The manifold 116, 118 is shaped so as to redirect the sound waves, produced by the transducers 112, 114 and received at the first opening, away from the corresponding one of the front 108 and back 120 facings of the device 100 toward the respective second opening 106 located in a corresponding one of the two opposing side facings 110 of the device 100.

In the illustrated embodiments, the manifold 112, 114 is "L"-shaped having two legs, where one leg is oriented substantially perpendicular to the other leg. The first leg has a cross sectional area proximate in shape and slightly smaller than the front facing of the transducer 112, 114, which in the illustrated embodiment is circular. The first leg has a propagation length that is relatively short compared to the propagation length of the second leg. The second leg has a cross sectional area in the shape of a slot. The cross sectional width of the slot is sufficiently narrow so as to accommodate sound wavelengths that are greater than the slot width. The cross sectional length of the slot is sufficiently long, at least at the opening, so as to not be blocked by the contact surface of a user's finger. While a specific size and shape of the manifold 112, 114 has been illustrated and discussed, one skilled in the art will readily recognize, that the sound waves can be appropriately redirected with manifolds 112, 114 having other shapes and sizes, including legs that meet at an angle, which are not substantially perpendicular.

By orienting the transducers 112, 114, and manifolds 116, 118, as shown, a minimal amount of interior space of the device can accommodate the sound system assembly, while routing each of the sound waves produced by the transducers 112, 114, so as to exit the device 100 proximate the device's corresponding side facing 110. In the illustrated embodiment, the transducers 112, 114 are side-by-side or laterally offset from one another in a horizontal direction along the front facing of the device 100. However, it is possible that the transducers 112, 114, could be stacked, and/or alternatively spaced and/or angled and still enjoy the benefits of the teachings of the present invention.

By porting a left audio signal out of the left side of the phone, and porting a right audio signal out of the right side of the phone, a stereo audio image can be produced. Furthermore, the apparent separation of the signal sources is extended to the full width of the hand held device 100. Still further, the direction of the porting arrangement is conducive to creating reflections from nearby objects, which can further enhance the perception of increased separation of the sources of the left and right side signals. By adjusting the depth of the transducers 112, 114, the specific shape of the manifold 116, 118, and correspondingly the location of the ports 106, the exact location, relative to the side facing of the device 100 that the sound waves exit the device 100, can be adjusted.

The beneficial effects of the increased spacing is especially prevalent, when the device is in front of the user, for example, if the user is viewing the display (i.e. accessing a menu, playing a game, etc.). In an alternative embodiment, where the user may reorient the device, by rotating the device 90 degrees during usage, it may be beneficial to place audio output ports on the top and bottom side surfaces of the hand held device. A pair of audio output ports on the top and bottom side surfaces of the hand held device can be in addition to the pair of output ports located on the opposing side facings of the device 100. In such an instance a tilt sensor could detect the orientation of the device, and appropriately enable the corresponding pair of audio output ports, which have a horizontal spacing.

Figure 4:
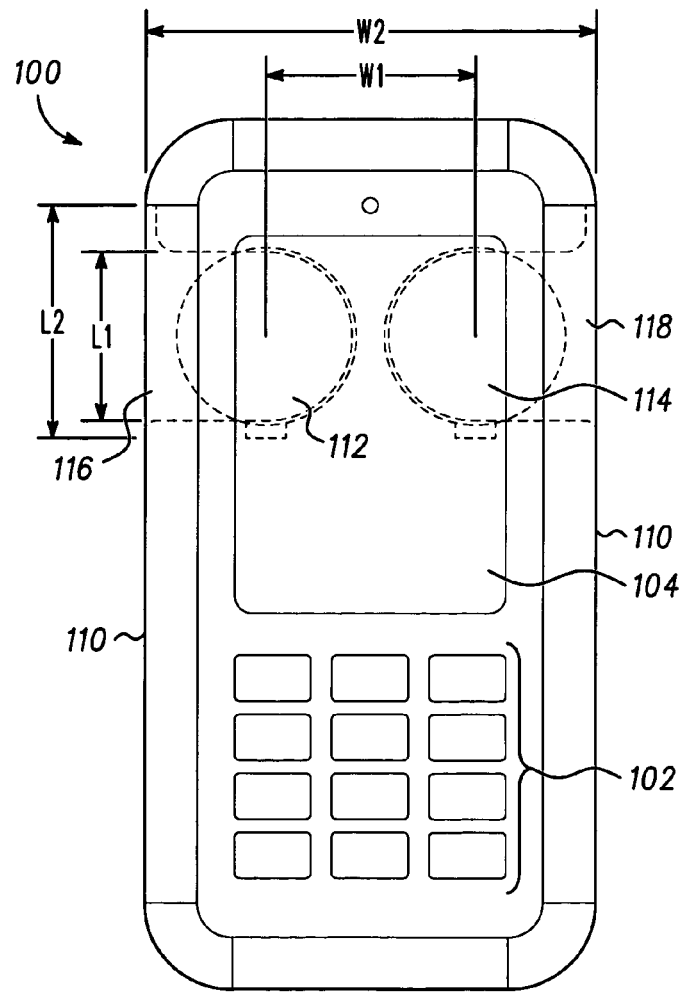
FIG. 4 is a front plan view of the hand held device, illustrated in FIG. 1.

FIG. 4 illustrates a front plan view, of the device illustrated in FIGS. 1-3. More specifically, FIG. 4 illustrates the apparent distance W1 between audio stereo sources, associated with the location of ports, where the sound waves have not been redirected, as opposed to the apparent distance W2 between audio stereo sources, where the sound waves have been redirected, in accordance with the present invention. The front plan view additionally illustrates the expansion of the length L1 of the slot-shaped cross sectional area of the redirected leg portion of the manifold to an expanded length L2 proximate the opening 106 in the side wall of the device 100. As noted previously, the expanded length L2 is longer than the contact surface of a user's finger.

Figure 5:
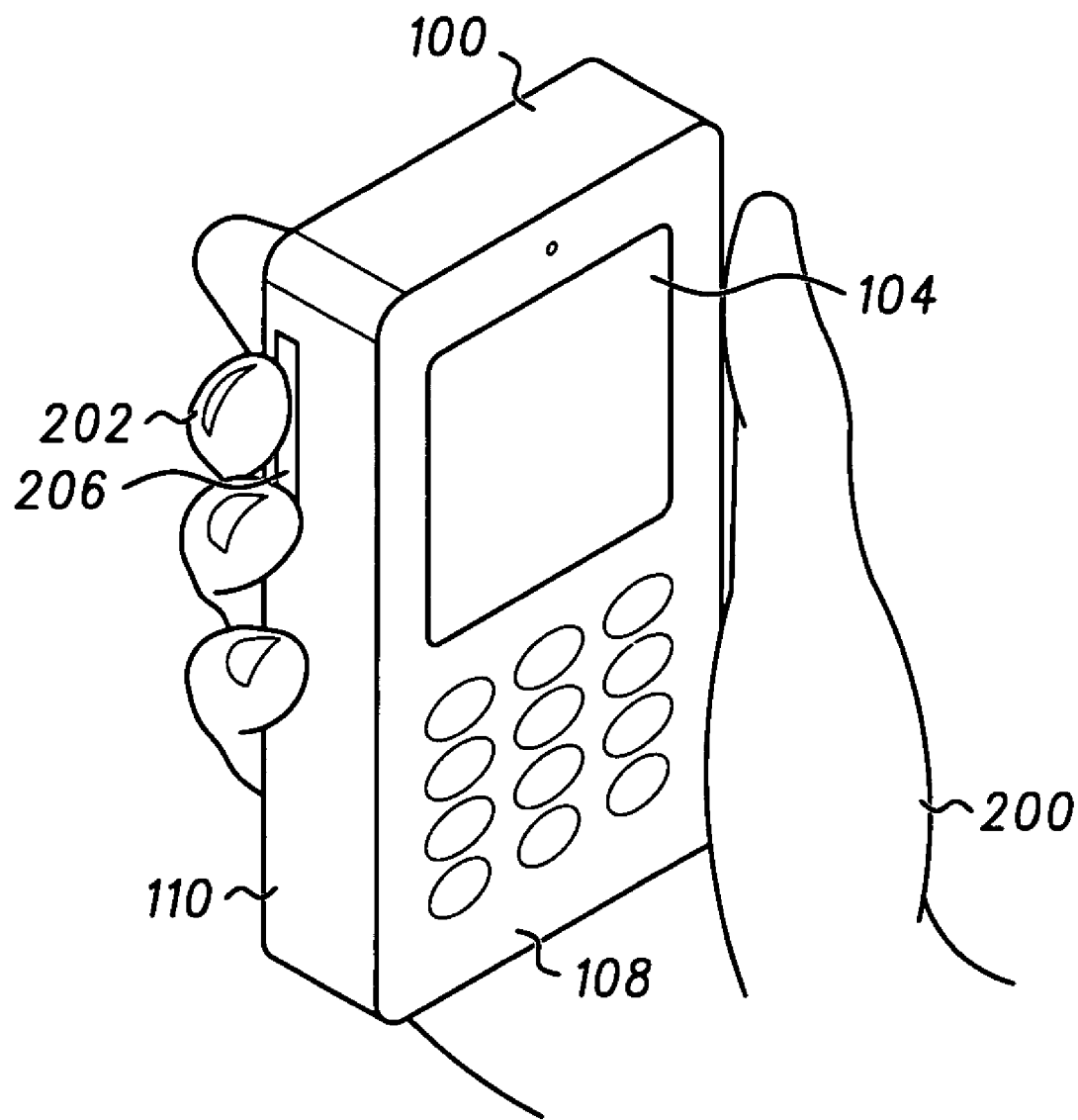
FIG. 5 is a perpective view of a hand held device, which is being held by a user.

In addition to having an expanded length L2, the slot opening is additionally located proximate the top of the device 100 near the display, where it may be less likely that a user's hand will be gripping the phone. Consequently, any attempt to avoid obstructing and/or covering the display by the users in many instances may also discourage the covering of the audio ports 106. FIG. 5 illustrates, at least one example of a perspective view of a device being held by a user's hand 200, which highlights the contact surface of the user's finger 202, which is in contact with the device 100 relative to the slot-shaped opening 106. While the present use of a slot shaped audio port opening having an extended length has been shown in connection with a pair of output ports for producing a stereo audio image, an extended length slot can beneficially be used in other instances, where a stereo audio image is not being produced, and/or where fewer or more audio ports are being used.

Figure 6:
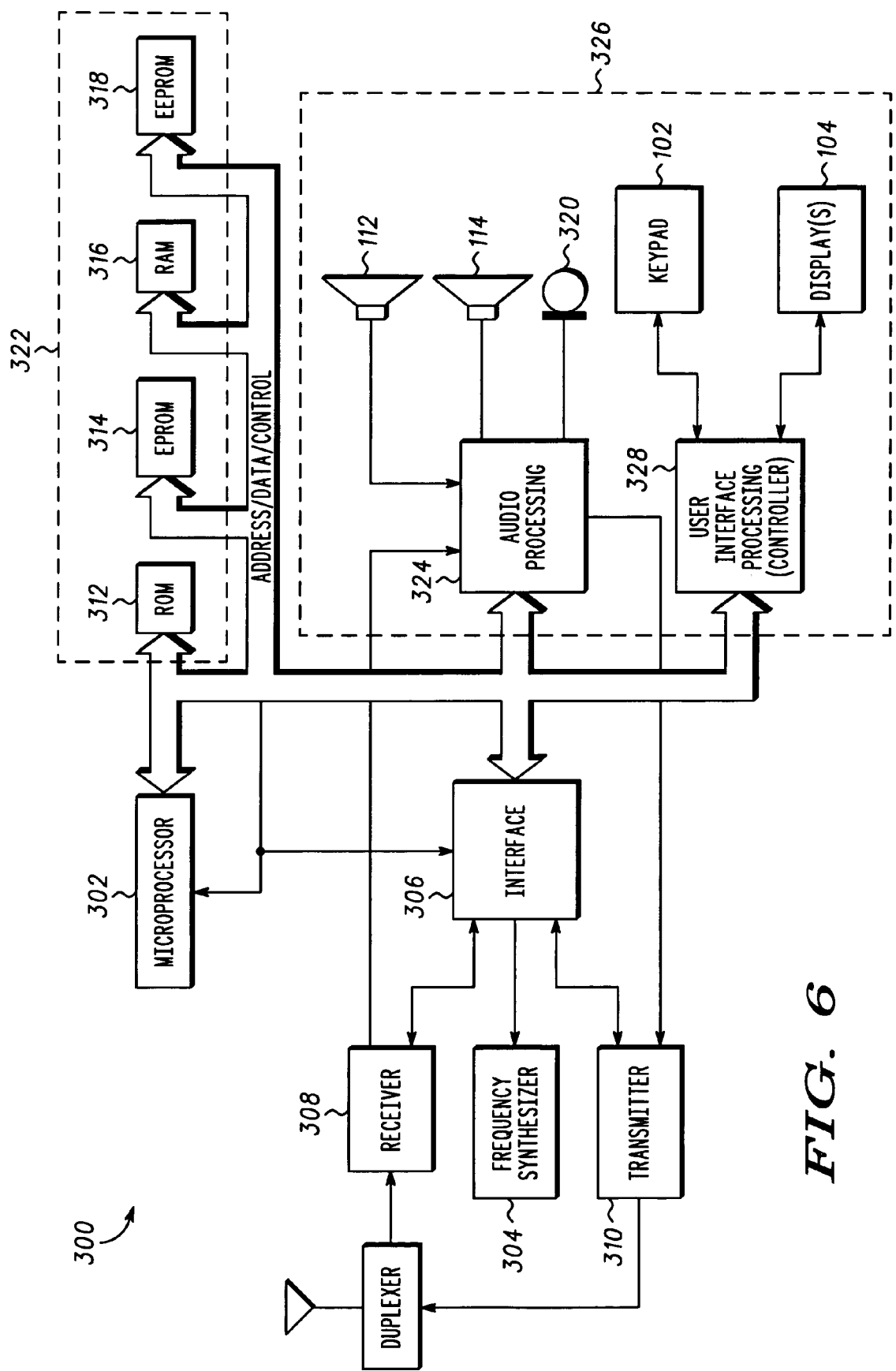
FIG. 6 is a block diagram of a wireless communication device, within which the sound system assembly of FIGS. 1-5 can be incorporated.

FIG. 6 illustrates a block diagram of a wireless communication device 300, like a cellular telephone, within which the present invention can be incorporated. Generally, the wireless communication device communicates information via radio frequency signals. In the wireless communication device 300, the particular radio frequency is determined by the microprocessor 302. The particular radio frequency is conveyed to the frequency synthesizer 304 via the interface circuitry 306. Data signals received by the receiver 308 are decoded and coupled to the microprocessor 302 by the interface circuitry 306, and data signals to be transmitted by the transmitter 310 are generated by the microprocessor 302 and formatted by the interface circuitry 306 before being transmitted by the transmitter 310. Operational status of the transmitter 310 and the receiver 308 is enabled or disabled by the interface circuitry 306.

In at least one embodiment, the microprocessor 302, an audio processor 324, and a user interface processor 328 perform many of the processing functions under the control of program instructions stored in a memory section 322. Together, the microprocessor 302, the audio processor 324, and the user interface processor 328 can include one or more microprocessors, one or more of which may include a digital signal processor (DSP). The memory section 322 includes one or more forms of volatile and/or non-volatile memory including conventional ROM 312, EPROM 314, RAM 316, or EEPROM 318. One skilled in the art will readily recognize that other types of memory are possible.

Identifying features of the wireless communication device are typically stored in EEPROM 318 (which may also be stored in the microprocessor in an on-board EEPROM, if available) and can include the number assignment (NAM) required for operation in a conventional cellular system and/or the base identification (BID) required for operation with a cordless base. Additionally stored in the memory section 322 are prestored instructions for reproducing a stereo audio image. In many cases prestored and/or downloaded audio files for later playback may be additionally stored, such as ringer tones, sounds generated by the programming of the user interface, multi-media and/or other types of files with audio related data. These files can be stored in either open standard, proprietary, and/or other types of formats.

Control of user audio, the microphone 320 and the pair of speakers, corresponding to the pair of transducers 112, 114, illustrated in FIGS. 2-4, is controlled by the audio processor or audio processing circuitry 324, which forms part of a user interface circuit 326. The user interface circuit 326 additionally includes the user interface processor or user interface processing circuitry 328, which manages the operation of any keypad(s) 102 and/or display(s) 104. It is further envisioned that any keypad operation could be included as part of a touch sensitive display.

While the present invention has generally been described in association with a wireless communication device, like a cell phone, radiotelephone, or a cordless telephone, one skilled in the art will readily recognize that the invention is suitable for use with other types of devices. At least a couple of additional examples of other types of devices, where the use of the present invention would be suitable include paging devices, personal digital assistants, portable computers, pen-based or keyboard-based handheld devices, remote control units, an audio player (such as an MP3 player) and the like.

Figure 7:
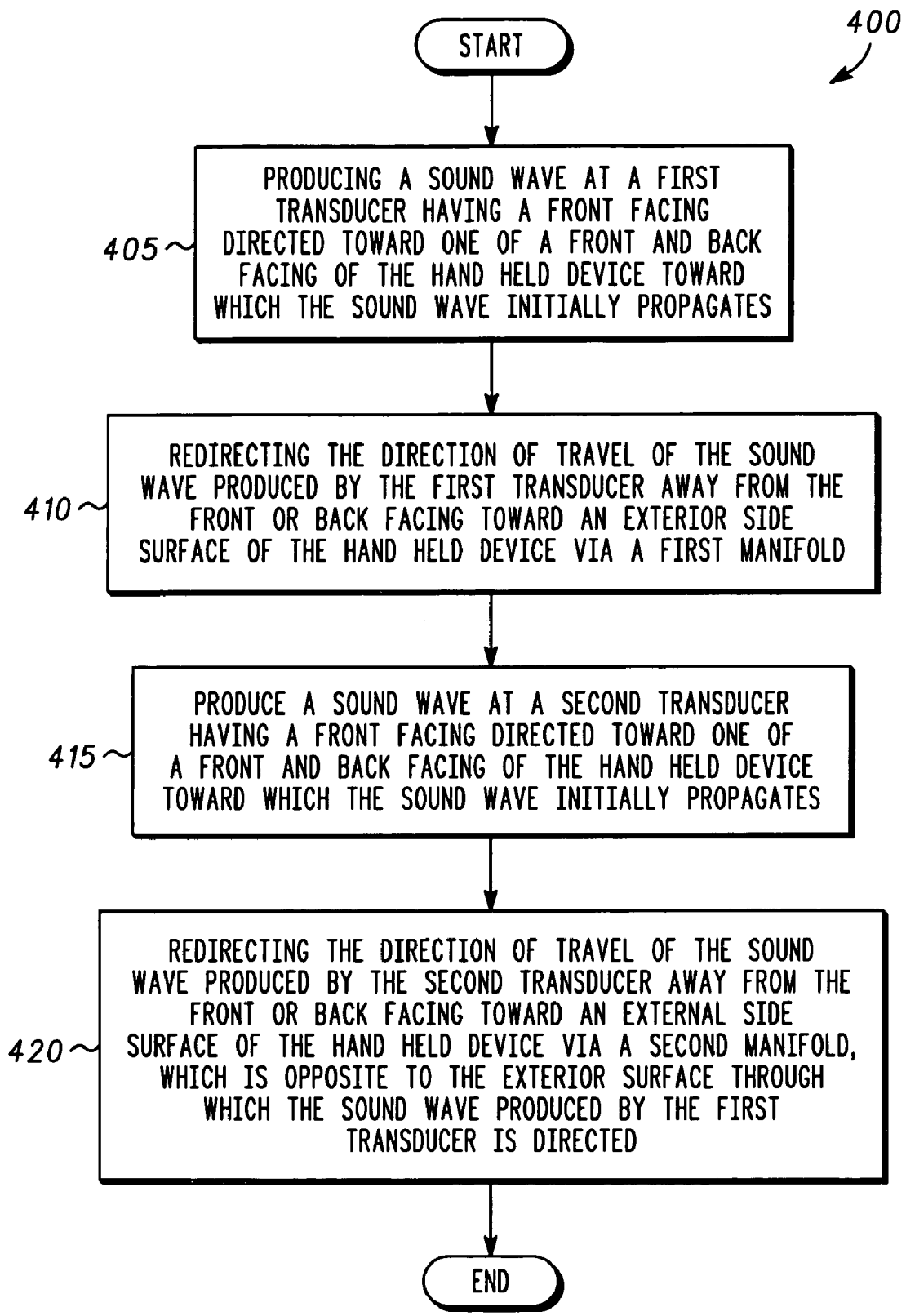
FIG. 7 is a flow diagram of a method for reproducing a stereo audio image in a hand held device, in accordance with at least one embodiment of the present invention.

FIG. 7 illustrates a flow diagram of a method 400 for reproducing a stereo audio image in a hand held device, which has a pair of transducers ported out of the device via a pair of corresponding manifolds. The manifolds have a first opening aligned with the respective one of the pair of transducers and a second opening aligned with an exterior surface of the hand held device. The method 400 includes producing 405 a sound wave at a first transducer having a front facing directed toward one of a front and back facing of the hand held device toward which the sound wave produced by the first transducer initially propagates. The direction of travel of the sound wave produced by the first transducer is then redirected 410 away from the one of the front and back facing of the hand held device toward an exterior side surface of the hand held device via a first manifold.

A sound wave is produced 415 at a second transducer having a front facing directed toward one of a front and back facing of the hand held device toward which the sound wave produced by the second transducer initially propagates. The direction of travel of the sound wave produced by the second transducer is then redirected 420 away from the one of the front and back facing of the hand held device toward an exterior side surface of the hand held device via a second manifold, which is opposite to the exterior side surface through which the sound wave produced by the first transducer is redirected.

In at least one embodiment the sound wave produced by the first transducer is produced concurrently with the sound wave produced by the second transducer.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A sound system assembly for use in a hand held device having a front facing, a back facing and two opposing side facings, the sound system assembly comprising:
   a first transducer for producing sound waves, the first transducer having a front facing directed substantially toward one of the front facing and the back facing of the hand held device;
   a first manifold having a first opening aligned with the front facing of the first transducer, a second opening aligned with a first one of the two opposing side facings of the hand held device, the first opening of the first manifold being coupled to the second opening of the first manifold via a path, wherein the path redirects the sound waves produced by the first transducer away from the one of the front facing and the back facing of the hand held device, toward which the front facing of the first transducer is directed, toward the first one of the two opposing side facings of the hand held device;
   a second transducer for producing sound waves, the second transducer having a front facing directed substantially toward one of the front facing and the back facing of the hand held device; and
   a second manifold having a first opening aligned with the front facing of the second transducer, a second opening aligned with a second one of the two opposing side facings of the hand held device, the first opening of the second manifold being coupled to the second opening of the second manifold via a path, wherein the path redirects the sound waves produced by the second transducer away from the one of the front facing and the back facing of the hand held device, toward which the front facing of the second transducer is directed, toward the second one of the two opposing side facings of the hand held device.

2. The sound system assembly in accordance with claim 1 wherein at least one of the first and second manifolds redirects the sound waves in a direction substantially perpendicular to the direction of travel of the sound waves, when the sound waves are originally produced by the corresponding transducer.

3. The sound system assembly in accordance with claim 1 wherein after the sound waves are redirected the direction of travel of the path of the manifold is substantially parallel to the at least one of the front and back facings of the hand held device toward which the front facing of the corresponding transducer is directed.

4. The sound system assembly in accordance with claim 1 wherein after the sound waves are redirected the direction of travel of the path of the manifold is substantially parallel to the at least one of the front and back facings of the hand held device away from which the front facing of the corresponding transducer is directed.

5. The sound system assembly in accordance with claim 1 wherein the front facing of at least one of the first and second transducers is parallel to the one of the front facing and the back facing of the hand held device, toward which the front facing of the at least one of the first and second transducers is directed.

6. The sound system assembly in accordance with claim 1 wherein the first and second transducers are laterally displaced, relative to one another, along a line that is substantially parallel to the at least one of the front facing and the back facing of the hand held device, toward which the front facing of the first and second transducers are directed.

7. The sound system assembly in accordance with claim 1 wherein each of the second openings of both the first and second manifolds are slots located in the corresponding opposing side facing.

8. The sound system assembly in accordance with claim 7 wherein each of the slots has a width, which is less than a predetermined highest frequency wavelength for which the sound system is designed to effectively reproduce.

9. The sound system assembly in accordance with claim 7 wherein the length of the slot is larger than the contact surface of a user's finger, such that if the user's finger covers any portion of the slot, the user's finger does not cover the entire slot.

10. The sound system assembly in accordance with claim 1 wherein each of the second openings of both the first and second manifolds are located toward the top of the device on each of the respective opposing side facings.

11. The sound system assembly in accordance with claim 1 wherein the hand held device further comprises a display, and wherein each of the second openings of both the first and second manifolds is located on each of the respective opposing side facings vertically positioned to coincide with the vertical position of at least a portion of the display.

12. The sound system assembly in accordance with claim 1 wherein each of the first openings of both the first and second manifolds has a size and shape substantially corresponding to the front facing of each of a respective one of the first and second transducers.

13. The sound system assembly in accordance with claim 1 wherein the hand held device is a wireless radio telephone.

14. A method for reproducing a stereo audio image in a hand held device having a pair of transducers ported out of the device via a pair of corresponding manifolds having a first opening aligned with the respective one of the pair of transducers and a second opening aligned with an exterior surface of the hand held device, said method comprising the steps of:
   producing a sound wave at a first transducer having a front facing directed toward one of a front and back facing of the hand held device toward which the sound wave produced by the first transducer initially propagates;
   redirecting the direction of travel of the sound wave produced by the first transducer away from the one of the front and back facing of the hand held device toward an exterior side surface of the hand held device via a first manifold;

producing a sound wave at a second transducer having a front facing directed toward one of a front and back facing of the hand held device toward which the sound wave produced by the second transducer initially propagates; and redirecting the direction of travel of the sound wave produced by the second transducer away from the one of the front and back facing of the hand held device toward an exterior side surface of the hand held device via a second manifold, which is opposite to the exterior side surface through which the sound wave produced by the first transducer is redirected.

15. The method in accordance with claim 14 wherein the sound wave produced at the first transducer is produced concurrently with the sound wave produced at the second transducer.

* * * * *